United States Patent
Hu et al.

(10) Patent No.: US 8,630,170 B2
(45) Date of Patent: Jan. 14, 2014

(54) SYSTEMS AND METHODS FOR TASK SCHEDULING IN MULTI-MODE SOFTWARE DEFINED RADIO DEVICES

(75) Inventors: Liangliang Hu, Shanghai (CN); Yanmeng Sun, Shanghai (CN)

(73) Assignee: NXP, B.V., Eindhoven (NL)

( * ) Notice: Subject to any disclaimer, the term of this patent is extended or adjusted under 35 U.S.C. 154(b) by 444 days.

(21) Appl. No.: 12/919,470

(22) PCT Filed: Feb. 26, 2009

(86) PCT No.: PCT/IB2009/050789
§ 371 (c)(1),
(2), (4) Date: Feb. 4, 2011

(87) PCT Pub. No.: WO2009/107094
PCT Pub. Date: Sep. 3, 2009

(65) Prior Publication Data
US 2011/0116369 A1     May 19, 2011

Related U.S. Application Data

(60) Provisional application No. 61/031,539, filed on Feb. 26, 2008.

(51) Int. Cl.
*H04L 12/58*     (2006.01)

(52) U.S. Cl.
USPC ........... 370/230; 370/235; 370/252; 370/328; 370/395.42

(58) Field of Classification Search
USPC ......... 370/229, 230, 235, 252, 254, 255, 328, 370/329, 334, 395.4, 395.41, 395.42, 431, 370/437, 468
See application file for complete search history.

(56) References Cited

U.S. PATENT DOCUMENTS

| 6,005,866 A | * | 12/1999 | Lincoln ........................ 370/398 |
| 2004/0123295 A1 | | 6/2004 | Karam et al. |
| 2010/0067519 A1 | * | 3/2010 | Mang et al. ................... 370/352 |

FOREIGN PATENT DOCUMENTS

| EP | 1 496 424 A2 | 1/2005 |
| KR | 2006 0003446 A | 1/2006 |

OTHER PUBLICATIONS

3GPP TS 25.221; "3$^{rd}$ Generation Partnership Project: Technical Specification Group Radio Access Network, Physical Channels and Mapping of Transport Chanels Onto Physical Channels (TDD)".
Wayne, Wolf; "High Performance Embedded Computing"; Referex, 2007, San Francisco, CA, US.
International Search Report for Application PCT/IB2009/050789 (Feb. 26, 2009).

* cited by examiner

*Primary Examiner* — Yemane Mesfin
*Assistant Examiner* — Mon Cheri Davenport

(57) ABSTRACT

A software-defined radio system processes radio signals on multiple radios according to a task scheduling method. The scheduling method includes assigning a priority value to each received radio packet, the assigned priority value reflective of preset radio preferences and risk of radio packet loss, and determining a processing execution order for the received radio packets according to earliest associated processing deadline. If there is sufficient time to process each of the radio packets in the processing execution order ahead of their associated processing deadlines, the radio packet are so processed. Otherwise, the radio packet having the lowest priority is abandoned, the radio packets are re-ordered, and time sufficiency is re-checked.

20 Claims, 3 Drawing Sheets

Figure 1:
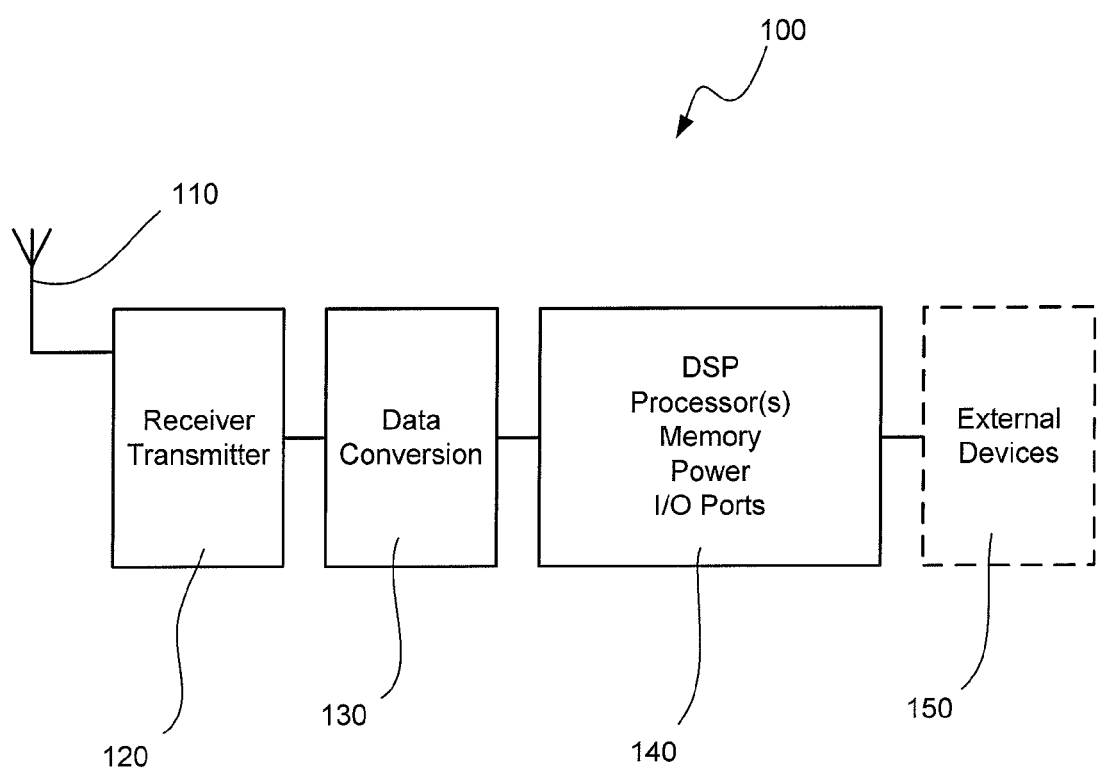

SYSTEMS AND METHODS FOR TASK SCHEDULING IN MULTI-MODE SOFTWARE DEFINED RADIO DEVICES

The present invention relates generally to scheduling and prioritizing the processing of radio packets in multi-mode software defined radio terminals.

With the continued development of integrated circuit technology, Software Defined Radio (SDR) has emerged as an important new technology for wireless communications. SDR technology can be defined as radios that provide software control of a variety of modulation techniques, wideband or narrow-band operation, communications security functions (such as hopping), and waveform requirements of current and evolving standards over a broad frequency range. SDR technology implements the radio functionality as software modules running on a generic processor, and multiple software modules can be used to implement multiple standards presented in the same radio system. Because different standards are processed differently, task scheduling and switching are used in an attempt to meet the real time requirements.

Scheduling methods used in certain operating systems include first-in, first out (FIFO) methods, round robin methods, and rate monotonic scheduling. Such scheduling methods generally involve managing different kinds of tasks of an operation system where the granularity and task processing time can vary greatly. However, the real time requirements of these tasks are generally not critical, which means that adding new tasks to the scheduling does not generally involve shuffling the processing order. In contrast, for the baseband processing of SDR terminals, the different radio tasks are relatively stable (that is, the number, sequence and run time of the tasks are generally fixed) but the real time requirements are more critical and the signal processing throughput is high.

Various aspects of the present invention are directed to methods for use in a software-defined radio system for scheduling processing of received radio data packets from multiple radios. Such methods include assigning a priority value to each received data packet, the assigned priority value being reflective of preset radio preferences and risk of data packet loss. Each received data packet has an associated processing deadline that is used to determine a processing execution order. For each received data packet, it is determined whether there is sufficient time to process the data packet in the processing execution order ahead of the associated processing deadline. Responsive to determining that there is insufficient time to process at least one of the received data packets, the data packet having the lowest assigned priority value is abandoned. The remaining data packets are then re-ordered and re-checked for processing time sufficiency, and in certain embodiments the assigned priority values are updated. Responsive to determining that there is sufficient time to process each of the received data packets, the received data packets are executed in the processing execution order.

Various aspects of the present invention are further directed to software-defined radio systems for processing radio signals in accordance with methods of the present invention. Such systems include an antenna to receive and transmit RF signals, an RF circuit connected to the antenna and including a receiver and a transmitter, a processing circuit to process radio packets, and a converter circuit coupled between the RF circuit and processing circuit to prepare received signals for processing and to prepare processed signals for transmission. The processing circuit may include a DSP and controller unit, and is operable to process concurrently received radio packets in order according to earliest associated processing deadline, assign priority values to each radio packet reflective of preset radio preferences and risk of data packet loss, abandon the radio packet having the lowest assigned priority value in response to determining that there is insufficient time to process each radio packet in the processing order ahead of the associated processing deadline, and process the radio packets in the processing order in response to determining that there is sufficient time to process each radio packet in the processing order ahead of the associated processing deadline.

Various aspects of the present invention are further directed to dynamic scheduling tables for use in scheduling processing of multiple received radio data packets in a multi-mode software-defined radio system. Such dynamic scheduling tables are readable and updatable by a controller in the processing circuit, and tabulate a processing execution order for the received radio packets according to earliest associated processing deadline, an assigned priority value for each received radio packet, the assigned priority values reflective of preset radio preferences and risk of data packet loss, a remaining processing time for each received radio packet, and a time to associated processing deadline for each radio packet, the dynamic scheduling table being updated each time a radio packet is dropped or added.

The above summary is not intended to describe each embodiment or every implementation of the present disclosure. The figures and detailed description that follow more particularly exemplify various embodiments.

Figure 2:
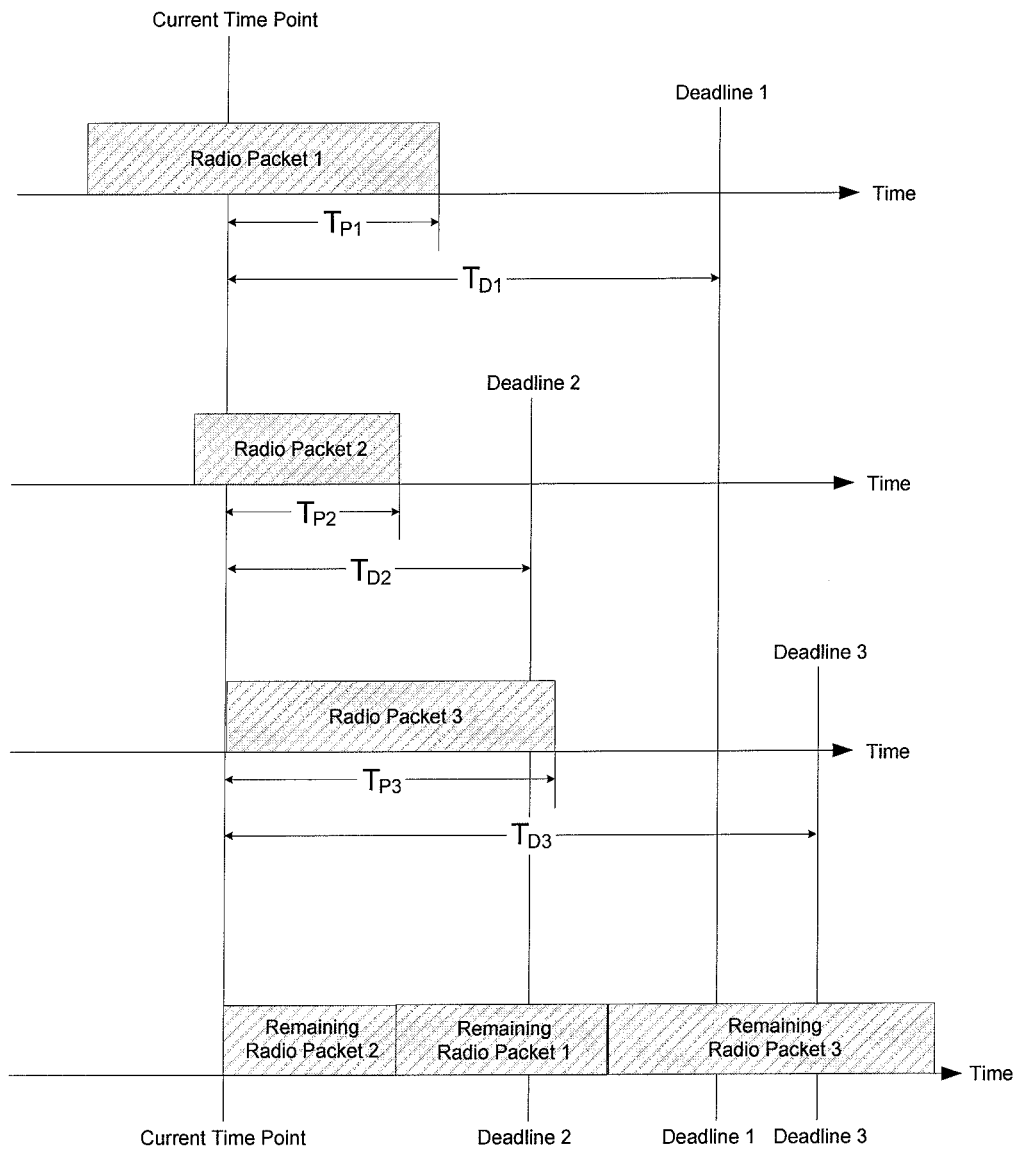
Figure 3:
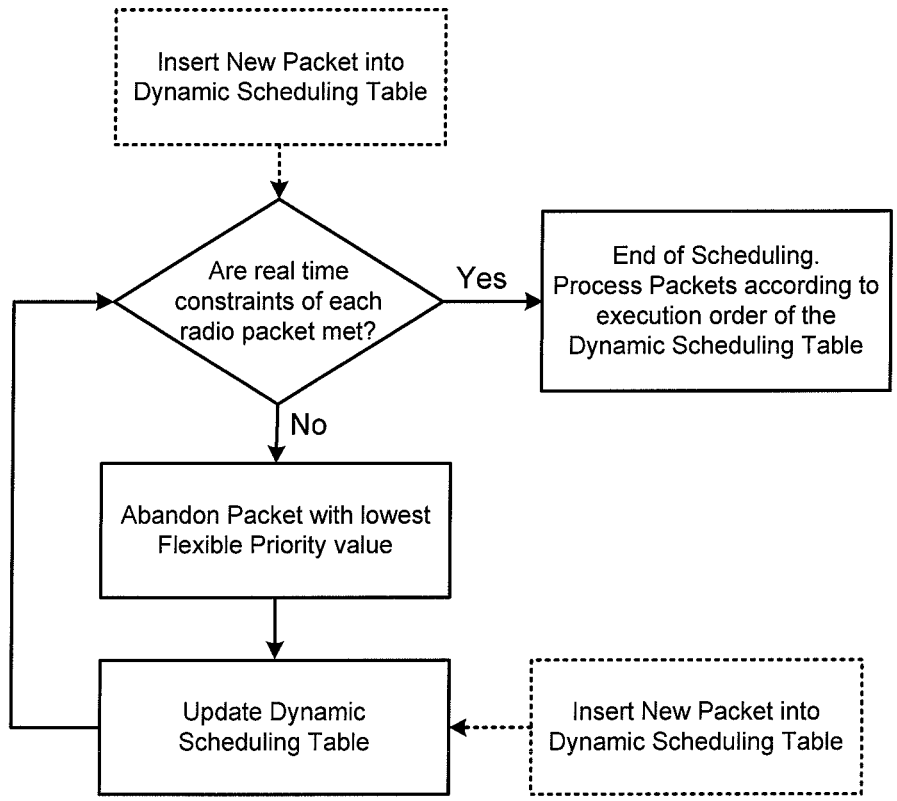

The invention may be more completely understood in consideration of the following detailed description of various embodiments of the invention in connection with the accompanying drawings, in which:

FIG. 1 schematically illustrates functional blocks of a software defined radio device that can be used in accordance with certain embodiments of the present invention;

FIG. 2 schematically illustrates receiving and scheduling the processing of multiple radio packets in accordance with certain embodiments of the present invention; and FIG. 3 schematically illustrates a flow diagram of steps that can be implemented in accordance with certain embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined by the appended claims.

Embodiments of the present invention relate to systems and methods for dynamic scheduling of radio signals in multi-mode SDR terminals. In exemplary embodiments, dynamic scheduling tables are used to determine the processing order of multiple radio packets, and in the case of constraints on the processor, using assigned flexible priority values to determine which radio packets can be dropped in favor of higher priority signals. The dynamic scheduling table and flexible priority values can be updated (for example periodically and/or responsive to the receipt of a new radio packet) to promote efficiency and flexibility in task scheduling.

In accordance with exemplary embodiments, the present invention provides for assigning higher and lower priority values to different radios of a multi-mode SDR terminal, for example to help ensure quality of service for higher priority signals and to assist in task scheduling when real time constraints restrict the processing of one or more data packets. In certain embodiments, the assigned priority values are provided with flexibility so that lower priority radios can occupy the processor to help sustain the basic connection when there is a risk that it would otherwise be lost. A scheduling table can be implemented that provides the execution order of received radio packet, and contains remaining processing time, deadline time, and flexible priority value for each radio. In exemplary embodiments, the flexible priority value includes a predefined fixed priority and a dynamic priority that can be calculated based on context-dependent factors such as packet loss ratio.

In certain embodiments, the present invention provides methods for scheduling the processing of received radio data packets in a multi-mode software defined radio terminal where each radio packet has an associated processing deadline that defines a real time constraint. Such methods include (a) assigning a priority value to each received data packet, the assigned priority value reflective of preset radio preferences (fixed value) and risk of data packet loss (dynamic value), (b) determining a processing execution order for the received data packets according to earliest associated processing deadline, (c) determining whether there is sufficient time to process each received data packet in the processing execution order ahead of its associated processing deadline, and (d) responsive to determining that there is insufficient time to process at least one of the received data packets, removing the data packet having the lowest assigned priority value and repeating steps (b) through (d). Once it has been determined that there are no longer real time constraints in processing the remaining radio packets, the packets are processed in the determined order.

In SDR devices, different radio signals are processed concurrently using the same generic processing platform. As such, the generic processor has radio interrupt and context switch capabilities so that if during the processing of one radio data packet a radio packet of another radio is received, the system can schedule processing in a desired manner. In accordance with certain embodiments of the present invention, scheduling of radio tasks in SDR devices involves assigning priority values to the radio tasks and using the assigned priority when updating the processing schedule. In a multi-mode radio system, each radio may be associated with different priority values depending on context, user preference, risk of packet loss, and the like. For example, during a voice call in a cellular system, the SDR terminal user may prefer that the cellular data packets have a higher priority value relative to other radio packets to maintain better signal quality in the phone call and to mitigate the risk of a dropped call.

If several radio signals are presented for processing concurrently on the same processor and real time constraints are such that not all the packets can be processed in time, then one or more of the packets will not be processed (unless re-presented for processing). Priority values can be used to drop lower priority packets so that higher priority packets will be processed. In accordance with certain embodiments of the present invention, the priority values are flexible and dynamic to allow for circumstances where it may be desirable to keep low priority packets that would otherwise be dropped. For example, repeated interruption of lower priority radios may result in a lost connection, and as such the priority of the lower priority signals can be adjusted to mitigate the risk of a lost connection even if the result is delaying or dropping an otherwise higher priority signal.

Embodiments of the present invention may be suitably used in any SDR terminal and may be particularly useful in SDR terminals implementing a multiple radio system. Example radio systems include 2G, 3G/B3G cellular systems, WLAN series, Wi-Max, Bluetooth, ZigBee, Digital TV, GPS, and so forth. While various aspects of the present invention are described below in terms of multiple radio systems for the purposes of illustration, it will appreciated that the present invention is not so limited and that the methods disclosed herein are applicable to single radio systems in which different kinds of data packages are processed in parallel.

FIG. 1 schematically illustrates SDR terminal 100 that includes an antenna 110 used to wirelessly communicate RF signals. The RF signals are received by and transmitted from an RF block 120 that includes a receiver and a transmitter. The RF block 120 interfaces with a data conversion block 130 that provides analog-to-digital conversion (e.g., for signals received for processing) and digital-to-analog conversion (e.g., for processed signals presented for transmission). The data conversion block 130 interfaces with the baseband processing block 140 that includes processors such as a DSP and controller, memory, and input/output ports for connecting to external devices 150 such as displays, input devices, USB devices, audio input and output devices, and so forth.

In general, an SDR terminal includes some programmable and reconfigurable processing device such as a powerful DSP. Most base band signal processing is carried out in programmable processor. In addition to a DSP, an SDR terminal includes a controller (e.g., an ARM controller) to control the behavior of DSP. As such, the task scheduling method of the present invention may be implemented in the ARM controller. In exemplary embodiments, methods of the present invention are implemented in software/firmware. The dynamic scheduling tables used in accordance with the present invention may be stored in a memory of the ARM controller or in a system memory. The ARM controller reads and updates the scheduling table, and then controls the processing of the tasks in the DSP accordingly. While FIG. 1 shows a single antenna system, it will be appreciated that the present invention can be utilized in systems that include multiple antennas, multiple receivers and transmitters, as well as multiple DSPs and controllers.

FIG. 2 illustrates the concepts of remaining processing time Tp and deadline time $T_D$ of three radio packets. Consider that Radio Packet 1 was the only radio packet presented for processing. In this case, if the remaining processing time is less than the deadline time (i.e., $T_{P1}<T_{D1}$), then the processing of the Radio Packet 1 can be completed before Deadline 1. Receiving additional radio packets before processing of current packets can be completed may lead to an inability to process all the radio packets ahead of their respective deadlines. Such a situation can arise in an SDR terminal when several different radios are being presented for processing during overlapping time frames and on the same processing platform. In SDR systems, every radio packet has a deadline that represents a real time constraint. If the processing of a radio packet cannot be completed before its associated deadline, the radio packet will be considered as failed. If the processing of a radio packet is completed before the deadline, there will be some leisure time for the processor. While not specifically indicated for the sake of clear illustration, it is contemplated that task switching time be considered in the remaining processing time.

As shown in FIG. 2, Radio Packet 1 is received first, Radio Packet 2 is received second, and Radio Packet 3 is received third. Deadline 2 of Radio Packet 2 occurs first, and so Radio Packet 2 is scheduled to be executed first. Because the remaining processing time $T_{P2}$ is less than the deadline time $T_{D2}$, the processing of Radio Packet 2 can be completed in time according to earliest deadline first scheduling. Deadline 1 of Radio Packet 1 occurs second, and so Radio Packet 1 is scheduled to be executed second. Because the remaining processing time $T_{P1}$ plus the remaining processing time $T_{P2}$ is still less than the deadline time $T_{D1}$, the processing of Radio Packet 1 can be completed in time according to earliest deadline first scheduling. Deadline 3 of Radio Packet 3 occurs third, and so Radio Packet 3 is scheduled to be executed third. Because the remaining processing time $T_{P3}$ added to the remaining processing times $T_{P1}$ and $T_{P2}$ is greater than the deadline time $T_{D3}$, the processing of Radio Packet 3 cannot be completed in time according to earliest deadline first scheduling.

In the situation illustrated in FIG. 2, there is insufficient time to process all the received radio packets. Following only the rules of earliest deadline first scheduling, Radio Packet 3 would be dropped, even if it would be undesirable to do so. In accordance with exemplary embodiments of the present invention, priority values are assigned to each of the radios so that the radio packet associated with the lowest priority can be dropped in favor of the higher priority packets. In the situation illustrated in FIG. 2, dropping any one of the radio packets would allow processing of the other two to be completed on time.

In certain embodiments, dynamic scheduling based on flexible priority values in accordance with the present invention can be implemented by use of a dynamic scheduling table such as shown in Table 1. The dynamic scheduling table contains dynamic scheduling information such as Execution Order, the associated Radio Packet number, the associated Remaining Processing Time, the associated Time to Deadline, and the associated Flexible Priority Value. When a new radio packet is received, the SDR terminal will update the content of dynamic scheduling table and create an updated processing order according to the updated information.

TABLE 1

Example Dynamic Scheduling Table

| Execution Order | Radio Packet | Remaining Processing Time | Time to Deadline | Flexible Priority Value |
|---|---|---|---|---|
| 1 | $R_1$ | $T_{P1}$ | $T_{D1}$ | $P_1$ |
| 2 | $R_2$ | $T_{P2}$ | $T_{D2}$ | $P_2$ |
| 3 | $R_3$ | $T_{P3}$ | $T_{D3}$ | $P_3$ |
| ... | ... | ... | ... | ... |
| n | $R_n$ | $T_{Pn}$ | $T_{Dn}$ | $P_n$ |

While the Execution Order in the dynamic scheduling table is determined according to earliest deadline, the determination of which packet(s) to drop when confronted with real time constraints is made according to lowest flexible priority value. The real time constraint status of any given radio packet, Radio Packet i, can be checked using equation (1):

$$\sum_{n=1}^{i} T_{Pi} < T_{Di} \qquad (1)$$

Equation (1) is satisfied when Radio Packet i and all the radio packets scheduled to be processed before Radio Packet i in accordance with the dynamic scheduling table can be finished before the deadline of Radio Packet i. If equation (1) is satisfied for each of the radio packets in the dynamic scheduling table, then all the real time requirements are met. If equation (1) is not satisfied for one or more of the radio packets, then one or more radio packets are abandoned, starting with lowest priority value, until equation (1) is satisfied for each of the remaining radio packets.

In accordance with certain embodiments, the flexible priority value assigned is a soft value $P_i$ calculated by:

$$P_i = P_{Fi} + P_{Di} \qquad (2)$$

where $P_{Fi}$ is a fixed priority value, and $P_{Di}$ is a dynamic priority value. For example, $P_{Fi}$ may be a fixed priority value that represents a user preference or other preset value such as a default fixed priority value. Taking into consideration that many users find dropped cellular calls to be unacceptable, the fixed priority of cellular radio packets could be set higher than any other. In this way, if the processor is overloaded, the packets of other radios may be ignored to help ensure the voice quality of cellular call. The dynamic priority value $P_{Di}$ can be a variable value that is calculated using factors such as radio packet loss ratio, which represents the risk of packet or radio connection loss if the packet is dropped. Some radio systems have resend scheme so that lost data packets do not result in a total loss of the information. However, under most resend schemes, too many lost packet of a given radio can result in loss of that radio's connection. As such, using only static, fixed priority values may lead to unacceptable radio loss for lower priority radios. In these cases, the dynamic radio priority $P_{Di}$ can be used to adjust the total priority in a dynamic fashion. For example, in certain embodiments $P_{Di}$ can be defined by:

$$P_{Di} = a_i \cdot l_i \qquad (3)$$

where $a_i$ is a coefficient according to character of radio i, and $l_i$ is the packet loss ratio of radio i. Thus, as radio packet loss ratio increases (e.g., due to increased risk of connection loss), the dynamic priority is also increased to mitigate risk of loss.

FIG. 3 sets forth certain embodiments of methods of the present invention in the form of a flow chart. In response to receiving a new radio packet for processing, a check can be performed to determine whether the real time constraints for each of the radio packets can be met (e.g., in accordance with equation (1)). This check can be performed before or after updating the dynamic scheduling table to reflect the newly received radio packet. If the result of the check step is that the real time constraints for each of the received packets cannot be met, the packet with the lowest flexible priority is abandoned, the dynamic scheduling table is updated, and the check is performed again. This process continues until the check reveals that each of the radio packets can be processed in the scheduled order without time constraint, at which point the radio packets are processed according to the dynamic scheduling table. Note that at any time the processor may interrupt current radio packet processing and switch to processing another based on the dynamically updated schedule.

In addition to the above, the various processing approaches described herein can be implemented using a variety of devices and methods including general purpose processors implementing specialized software, digital signal processors, programmable logic arrays, discrete logic components and fully-programmable and semi-programmable circuits such as PLAs (programmable logic arrays). For example, the above algorithms are executed on a microcomputer (a.k.a. microprocessor) in connection with certain embodiments, and as may be implemented as part of one or more of the devices shown in the figures.

While the present invention has been described above and in the claims that follow, those skilled in the art will recognize that many changes may be made thereto without departing from the spirit and scope of the present invention.

What is claimed is:

1. For use in a software-defined radio system for processing radio signals on multiple radios, a method for scheduling processing of received radio packets each having an associated processing deadline, the method comprising:

(a) assigning a priority value to each received radio packet received wirelessly via radio signals conveyed in the software-defined radio system, the assigned priority value reflective of preset radio preferences and risk of radio packet loss;

(b) determining a processing execution order for the received radio packets according to earliest associated processing deadline;

(c) for each received radio packet, determining whether there is sufficient time to process the radio packet in the processing execution order ahead of the associated processing deadline; and (d) responsive to determining that there is insufficient time to process at least one of the received radio packets, removing the radio packet having the lowest assigned priority value and repeating steps (b) through (d); and responsive to determining that there is sufficient time to process each of the received radio packets, executing the received radio packets in the processing execution order.

2. The method of claim 1, further comprising performing steps (a) through (d) responsive to receiving an additional radio packet.

3. The method of claim 1, wherein the preset radio preferences include user-defined radio preferences.

4. The method of claim 1, wherein the risk of radio packet loss for a given radio packet includes whether the given radio packet is subject to being presented for reprocessing.

5. The method of claim 1, wherein the risk of radio packet loss for a given radio packet includes loss of associated radio connection.

6. The method of claim 1, further comprising storing the processing execution order in a dynamic scheduling table that includes for each received radio packet the associated processing deadline, a remaining processing time equal to the difference between the associated processing deadline and a current time, and the assigned priority value.

7. The method of claim 6, wherein the dynamic scheduling table is updated each time the processing execution order is determined.

8. The method of claim 6, wherein the dynamic scheduling table is updated in response to receiving an additional radio packet.

9. The method of claim 1, further comprising updating assigned priority values responsive to removing the radio packet having the lowest assigned priority value.

10. A software-defined radio system for processing radio signals on multiple radios, the systems comprising an antenna to receive and transmit radio frequency (RF) signals, an RF circuit connected to the antenna and including a receiver and a transmitter, a processing circuit to process radio packets, and a converter circuit coupled between the RF circuit and processing circuit to prepare received signals for processing and to prepare processed signals for transmission, the processing circuit operable to (a) process concurrently received radio packets in order according to earliest associated processing deadline, (b) assign priority values to each radio packet reflective of preset radio preferences and risk of data packet loss, (c) abandon the radio packet having the lowest assigned priority value in response to determining that there is insufficient time to process each radio packet in the processing order ahead of the associated processing deadline, and (d) process the radio packets in the processing order in response to determining that there is sufficient time to process each radio packet in the processing order ahead of the associated processing deadline.

11. The software-defined radio system of claim 10, wherein at least one of the radios is a cellular radio.

12. The software-defined radio system of claim 10, wherein the processing circuit includes a digital signal processor (DSP) to process the radio packets and a controller to control the DSP according to the processing order.

13. The software-defined radio system of claim 12, wherein the controller is an ARM controller.

14. The software-defined radio system of claim 10, further comprising multiple antennas.

15. The software-defined radio system of claim 10, further comprising multiple receivers and transmitters.

16. The software-defined radio system of claim 10, further comprising multiple processing circuits.

17. A dynamic scheduling table for use in scheduling processing of multiple received radio data packets in a multi-mode software-defined radio system, the software-defined radio system including an antenna to receive and transmit RF signals, an RF circuit connected to the antenna and including a receiver and a transmitter, a processing circuit that uses information from the dynamic scheduling table to process radio packets, and a converter circuit coupled between the RF circuit and processing circuit to prepare received signals for processing and to prepare processed signals for transmission, where the dynamic scheduling table being readable and updatable by a controller of the processing circuit, the dynamic scheduling table storing (i) a processing execution order for the received radio packets according to earliest associated processing deadline, (ii) an assigned priority value for each received radio packet, the assigned priority values reflective of preset radio preferences and risk of data packet loss, (iii) a remaining processing time for each received radio packet, and (iv) a time to associated processing deadline for each radio packet, the dynamic scheduling table being updated each time a radio packet is dropped or added.

18. The dynamic scheduling table of claim 17, wherein the assigned priority values are used to determine one or more radio packets to abandon when there is insufficient remaining processing time to process at least one received radio packet in the processing execution order ahead of the associated processing deadline for the at least one received radio packet.

19. The dynamic scheduling table of claim 17, wherein the dynamic scheduling table is stored in a memory of the processing circuit.

20. The dynamic scheduling table of claim 17, wherein the dynamic scheduling table is stored in a system memory.

* * * * *